United States Patent
Dawson, Jr. et al.

(10) Patent No.: US 11,748,880 B2
(45) Date of Patent: *Sep. 5, 2023

(54) AUGMENTED REALITY SYSTEMS AND METHODS FOR FINGERNAIL DETECTION AND TRACKING

(71) Applicant: BEAUTYUP TECHNOLOGIES, INC., San Diego, CA (US)

(72) Inventors: Dennis W. Dawson, Jr., San Diego, CA (US); Filippo Rossi, Mantova (IT); Taha Fayez Taha, Beirut (LB); Mohamad Fayez Taha, Campbell, CA (US)

(73) Assignee: BeautyUp Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,691

(22) Filed: Jul. 14, 2022

(65) Prior Publication Data

US 2023/0005137 A1 Jan. 5, 2023

Related U.S. Application Data

(63) Continuation of application No. 16/975,081, filed as application No. PCT/US2019/019875 on Feb. 27, 2019, now Pat. No. 11,393,089.

(Continued)

(51) Int. Cl.
*G06T 19/00* (2011.01)
*G06T 7/00* (2017.01)
(Continued)

(52) U.S. Cl.
CPC ....... *G06T 7/0012* (2013.01); *G06Q 10/1095* (2013.01); *G06T 7/248* (2017.01);
(Continued)

(58) Field of Classification Search
CPC ............ G06K 9/00375; G06Q 10/1095; G06T 7/248; G06T 19/006; G06T 2207/30196;
(Continued)

(56) References Cited

U.S. PATENT DOCUMENTS

2012/0232946 A1 9/2012 Cocanougher
2012/0262485 A1* 10/2012 Raghoebardajal ........ G06T 7/11
345/633

(Continued)

FOREIGN PATENT DOCUMENTS

KR 10-2012-0009710 A 2/2012
KR 10-2013-0007060 A 1/2013

*Primary Examiner* — Siamak Harandi
(74) *Attorney, Agent, or Firm* — Knobbe, Martens, Olson & Bear LLP

(57) ABSTRACT

A user may be directed to the nail application (e.g., a mobile application that provides the various augmented reality and booking features discussed herein) via interactions with a social media site. For example, a user may browse Facebook and see a friend's post or advertisement regarding a nail design, or more generally, some artwork that the user feels would look nice as a nail design. The user may select the artwork and be redirected to the nail application to begin an augmented reality testing of one or more nail artwork designs and/or schedule treatments. In some embodiments, the social media website utilizes an API provided by the data center (e.g. the entity that coordinates the treatment booking process and provides augmented reality software to the users) so that the user can "Touch to try-on" a particular design team in social media by clicking on the design.

11 Claims, 20 Drawing Sheets

Related U.S. Application Data

(60) Provisional application No. 62/636,139, filed on Feb. 27, 2018.

(51) Int. Cl.
    *G06T 7/246*       (2017.01)
    *G06Q 10/1093*    (2023.01)
    *G06V 40/10*       (2022.01)
    *H04L 67/60*       (2022.01)

(52) U.S. Cl.
    CPC .......... *G06T 19/006* (2013.01); *G06V 40/107* (2022.01); *H04L 67/60* (2022.05); *G06T 2207/30196* (2013.01)

(58) Field of Classification Search
    CPC . G06T 2207/20081; G06T 2207/20084; G06T 7/246; G06T 7/73; G06T 7/0012; H04L 67/32; H04L 67/60; G06V 40/107
    See application file for complete search history.

(56) References Cited

U.S. PATENT DOCUMENTS

| | | | |
|---|---|---|---|
| 2015/0235402 A1* | 8/2015 | Anderson | G06T 15/503 |
| | | | 345/641 |
| 2015/0356669 A1 | 12/2015 | Roescheisen | |
| 2017/0018024 A1 | 1/2017 | Xu | |
| 2018/0068577 A1 | 3/2018 | Javanbakht | |

\* cited by examiner

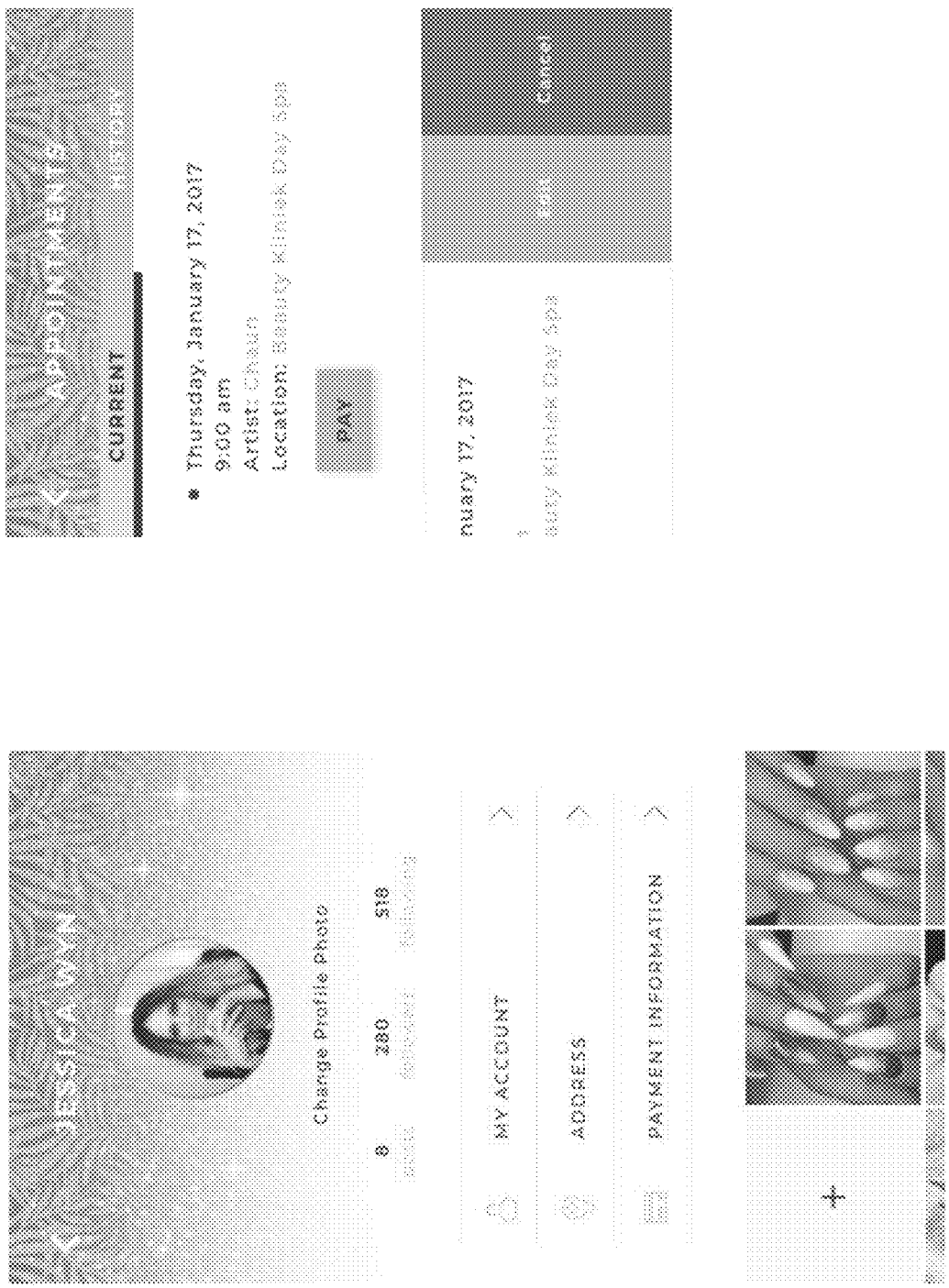

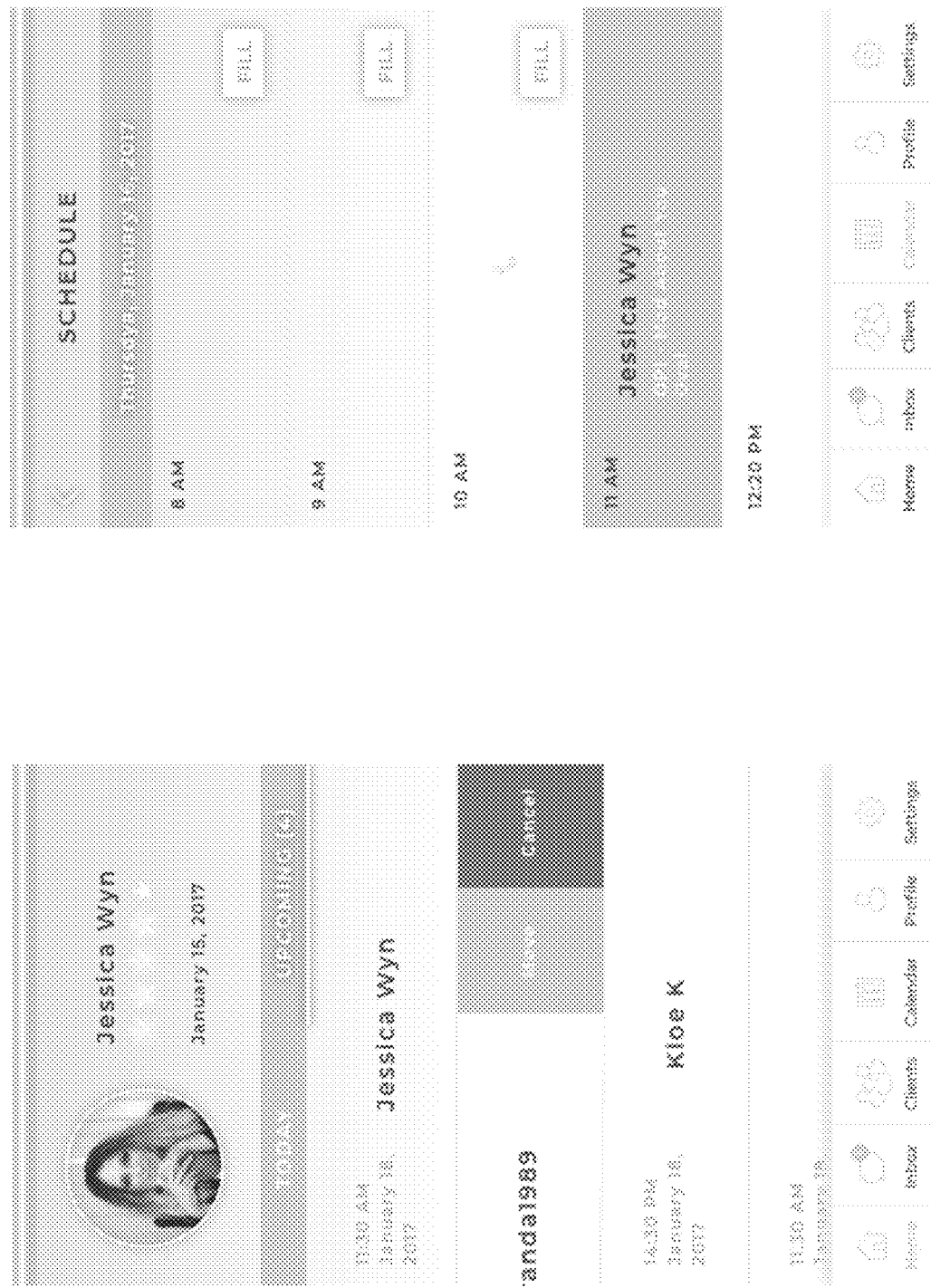

AUGMENTED REALITY SYSTEMS AND METHODS FOR FINGERNAIL DETECTION AND TRACKING

INCORPORATION BY REFERENCE TO ANY PRIORITY APPLICATIONS

This application is a continuation of U.S. application Ser. No. 16/975,081, filed Aug. 21, 2020, entitled "AUGMENTED REALITY SYSTEMS AND METHODS FOR FINGERNAIL DETECTION AND TRACKING," which is a U.S. National Phase of International Application No. PCT/US2019/019875, filed Feb. 27, 2019, entitled "AUGMENTED REALITY SYSTEMS AND METHODS FOR FINGERNAIL DETECTION AND TRACKING," which claims the benefit of U.S. Provisional Application Ser. No. 62/636,139, filed Feb. 27, 2018, entitled "BeautyUp Touch," all of which are hereby incorporated by reference in their entirety and for all purposes.

FIELD

The present disclosure relates generally to augmented reality applications, and more particularly to augmented reality systems and methods for detection and tracking of anatomical features in photo and video data.

BACKGROUND

Nail treatments and other cosmetic treatments are frequently provided at nail salons and other beauty salons. Nail salon customers typically experience a number of inefficiencies such as long wait times and difficulty in deciding on colors and other finishes. Selection of a nail treatment frequently is not done until after arrival at a salon and often involves difficulties such as fumbling with mannequin hands, browsing through an overwhelming number of color and style options, or trying to select a finish without being able to see how the treatment would look on the customer's own hands before the treatment. Accordingly, systems for a more efficient and/or enjoyable customer experience are desirable.

SUMMARY

The systems and methods of this disclosure each have several innovative aspects, no single one of which is solely responsible for its desirable attributes. Without limiting the scope as expressed by the claims that follow, its more prominent features will now be discussed briefly.

As disclosed herein, the systems and methods described may provide a social community of nail artists who display their designs and clients who discover them using augmented reality to try the nails on and book appointments. Advantageously, clients looking for nail treatments (e.g., individuals interested in manicures or pedicures) are able to take advantage of augmented reality ("AR") nail detection technology that detects images of the user's hands and provides images of various artists work as the art would appear on the user's actual fingernails. Additionally, clients may book nail treatment appointments directly from the system (e.g., an application executing on a mobile device of a consumer) with a provider (e.g., the artist and/or another salon technician), such as directly from an image of artwork that the user desires.

As discussed below, the systems and methods described herein allow a user to simply glide their hand under a smart device and virtually sample freshly polished manicured nails in real-time from the options provided by salons, brands, retailers, and social media. (1) Consumers purchase products and (2) book appointments accompanied by their polish selection, (3) while brands and salons reach and retain new clients through data driven marketing-streamlining the process and transforming the industry by decreasing wait time in the chair, empowering salons with data to anticipate a client's service, and interactively engaging consumers: effectively increasing revenue.

In one embodiment, a system includes one or more client applications executable by respective communication devices, each communication device including one or more processors in communication with an image capture device, the one or more processors configured with processor-executable instructions included in the client application to perform operations including. The operations may also include receiving, from the image capture device, frames of image data obtained at the image capture device, the image data including a finger of a user. The operations may also include detecting, within individual frames of the image data, a fingernail region of the finger, the fingernail region including a plurality of pixels corresponding to an imaged fingernail of the image data. The operations may also include identifying, within subsequent frames of the image data, the fingernail region, where the fingernail region in subsequent frames is positioned differently than in previous frames based on movement of the image capture device and/or finger of the user. The operations may also include display, on a display of the communication device, augmented reality images including the subsequent frames of the image data overlaid with a virtual nail treatment occupying at least a portion of the one or more fingernail regions, where the augmented reality images depict movement of the finger and fingernail while maintaining the virtual nail treatment on the fingernail region, and an identifier of the virtual nail treatment, the identifier selectable to initiate communication with a scheduling application configured to schedule an appointment with a service provider of the virtual nail treatment. The operations may also include transmitting, in response to selection of the identifier, request information associated with the virtual nail treatment identification information. Other embodiments of this aspect include corresponding computer systems, apparatus, and computer programs recorded on one or more computer storage devices, each configured to perform the actions of the methods.

In some embodiments, the system may further include a server including one or more processors configured with processor-executable instructions to perform operations including receiving, via the network, the request information from the communication device; identifying, based at least in part on the request information, a service provider corresponding to the request; and transmitting, via the network, a response to the communication device, the response including provider information corresponding to the identified service provider.

In some embodiments, the request information is associated with a request received from a user, at the communication device, to schedule an appointment corresponding to the displayed virtual nail treatment, and where the provider information identifies a service provider capable of providing a nail treatment corresponding to the virtual nail treatment. In some embodiments, the provider information further includes scheduling information indicative of one or more available appointment times of the service provider. In some embodiments, the one or more processors of the communication device are further configured with processor-executable instructions included in the client application to perform operations including: receiving, via a user interface of the communication device, a selection from the user of one of the one or more available appointment times of the service provider; and causing, at least in part, the server to send a scheduling request message to a service provider device associated with the service provider. In some embodiments, the request information is associated with a request received from a user, at the communication device, to purchase one or more products corresponding to the displayed virtual nail treatment, and where the provider information identifies a networked resource at which the one or more products are available for purchase. In some embodiments, the one or more processors of the communication device are further configured with processor-executable instructions included in the client application to perform operations including: determining that the provider information is associated with a product provider; responsive to determining that the provider information is associated with a product provider, causing the communication device to execute a browser application; and causing the browser application to navigate to the networked resource identified in the provider information. In some embodiments, the one or more processors are further configured with processor-executable instructions to perform operations including storing, in a data store associated with the communication device, user profile data, the user profile data corresponding to at least one of virtual nail treatment identification information or a provider information previously accessed by the user. Implementations of the described techniques may include hardware, a method or process, or computer software on a computer-accessible medium.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above-and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

FIGS. 23-26 are example screens of an example graphical user interface for modifying one or more settings associated with a user of an augmented reality nail detection system.

FIGS. 27-36 are example screens of an example graphical user interface for facilitating interactions between a service provider and one or more users of an augmented reality nail detection system.

DETAILED DESCRIPTION

Figure 1:
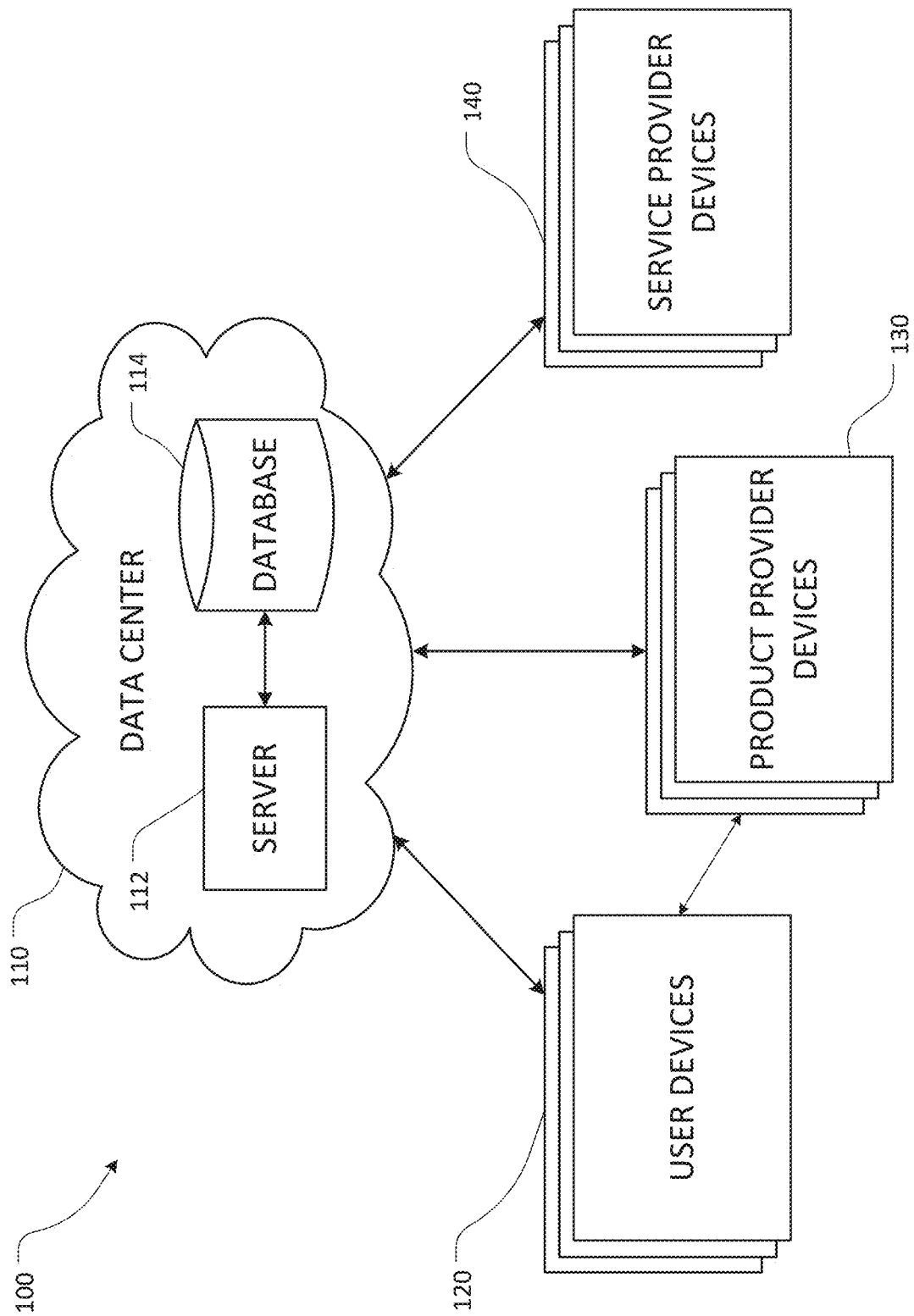
FIG. 1 is a block diagram showing an example networked computer system for augmented reality nail detection and tracking.

The following description is directed to certain implementations for the purpose of describing the innovative aspects of this disclosure. However, a person having ordinary skill in the art will readily recognize that the teachings herein can be applied in a multitude of different ways.

As described elsewhere herein, there are many technical problems associated with artists making their work known to potential customers, allowing customers to experiment with artwork in a real-time and augmented reality atmosphere, and to easily allow consumers to purchase such artwork in real life ("IRL"). Some of the problems and challenges in this area include:

Users (e.g., women (or men) that are interested in nail polishing) are not able to visualize nail design options from social media on actual hands, particularly their own hands.

Uncertainty of artist skill set to achieve desired nails.

Difficulty discovering quality designs and/or nail artists outside of a local area of the user.

Difficulty testing artist designs.

Difficulty booking through image of art work, such as directly from social media.

Lack of centralized platform for nail community to reach clients

Fragmented global nail industry

In certain embodiments discussed herein, a software platform is provided that allows users (e.g., individuals that want to find artistic designs for nail polishing) to identify, experiment with, and setup appointments to purchase nail treatments. Depending on the embodiment, the system (e.g., a user device and/or a server device) provides one or more of the features below:

User can simply glide their hand under a smart device and virtually sample freshly polished manicured nails in real-time from the options provided by salons, brands, retailers, and social media.

Full motion, real-time video, Augmented Reality Nail Detection Technology

Process of trying on nail designs using AR and booking selection directly from the image to a nail artist/salon/provider Trying on intricate nail designs (not basic solid polish colors)

Toggling and/or customizing nail shape & length

Process for licensing an artists' design to another

Consumers are enabled to purchase products and book appointments (with indications of a virtually sampled design), while brands and salons reach and retain new clients through data driven marketing—streamlining the process and transforming the industry by decreasing wait time in the chair, empowering salons with data to anticipate a client's service, and interactively engaging consumers: effectively increasing revenue and defragmenting the global nail industry.

For example, one sample use of the software platform comprises a user scrolling through Instagram (or other social media site), the user finds a nail image they like, but traditionally cannot try it on their nails or book an appointment to the artist. The nail system discussed herein bridges the gap between social media and the salon by allowing these images to be displayed and digitally adorned on their nails through augmented reality. In some embodiments the user can even customize the shape and design of the nails and book an appointment directly to the artists who created them. Similarly, in some embodiments the user can push a selected design to a salon of their choosing, such as by paying a use fee for the design that will be implemented by another nail artist.

FIG. 1 schematically depicts an example networked computer system 100 configured for augmented reality nail detection and tracking in accordance with various embodiments described herein. The system 100 generally includes a data center 110 operable to interact with one or more user devices 120, one or more product provider devices 130, and/or one or more service provider devices 140. The data center 110 includes at least one server 112 and at least one database 114.

The data center 110 can include one or more computing devices including processors and memory. The data center 110 includes one or more servers 112 and one or more data stores, such as the database 114. In some embodiments, the data center 110 can be a cloud-based and/or distributed network of computing devices. The computing devices of the data center 110 are configured for wired and/or wireless communications. The data center 110 is in communication with the user devices 120, product provider devices 130, and service provider device 140 via data connections, such as one or more wired or wireless internet connections. One or more software processes executing at the data center 110 are configured to receive and process data transmitted from the user devices 120, product provider devices 130, and/or service provider devices 140, and to transmit data to applications executing on the user devices 120, product provider devices 130, and/or service provider devices 140.

Non-limiting examples of the user devices 120 and service provider device 140 include a personal computing device, laptop computing device, hand held computing device, mobile device (e.g., mobile phones or tablet computing devices), wearable device configured with network access and program execution capabilities (e.g., "smart eyewear" or "smart watches"), wireless device, electronic reader, or some other portable electronic communication device or appliance. The user devices 120 are configured for wired and/or wireless communications. In some embodiments, a user device 120 is a smartphone or other computing device including image and/or video capture functionality. Individual user devices 120 can include one or more applications executing on a processor of the user device 120 and operable to interact with the data center 110.

The product provider devices 130 may be associated with one or more businesses such as merchants offering products associated with the applications executing on the user devices 120 and/or the service provider devices 140. For example, individual product provider devices 130 may be associated with entities that create nail treatment designs, such as artists, and/or entities that sell nail treatment products such as nail polish and/or other products associated with the application.

Figure 2:
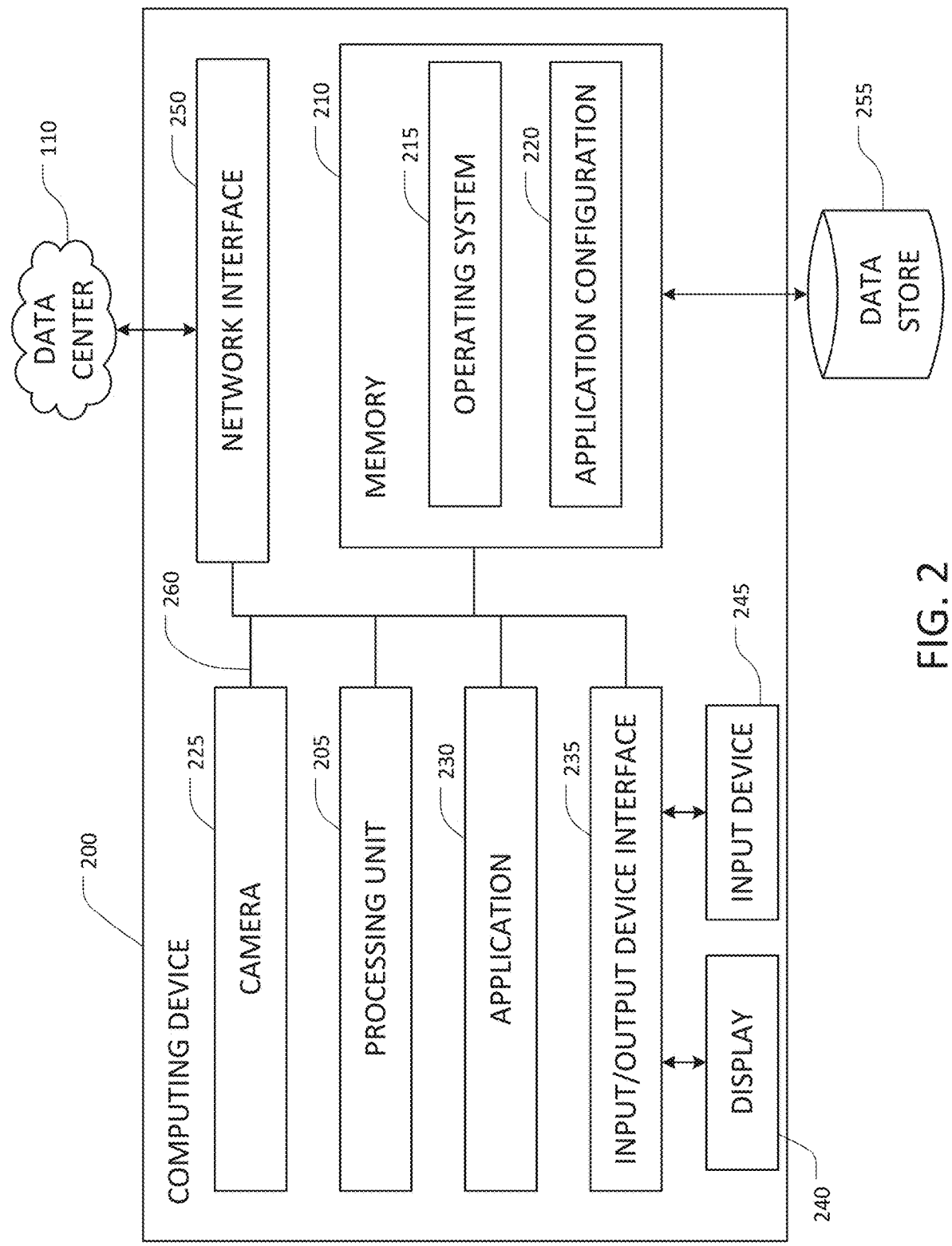
FIG. 2 is a block diagram of an illustrative computing device that may implement one or more of the nail detection and tracking features described.

FIG. 2 is a block diagram of an illustrative computing device 200 that may implement one or more of the features described. For example, the computing device 200 may be configured to function as a user device 120 or a service provider device 140 as depicted in FIG. 1. The computing device 200 can be a smartphone, tablet, hand held computing device, portable computing device, or other computing device. The computing device 200 may include a processing unit 205, a memory 210, a camera 225, an application 230, an input/output device interface 235, a display 240, an input device 245, and a network interface 250. The memory 210 may include an operating system 215 and an application configuration 220 associated with the application 230. The input/output device interface 235 is configured to interact with the display 240 or other output device (e.g., a microphone) and the input device 245. The memory 210 may further be in communication with an external data store 255. The network interface 250 can be configured to communicate with the data center 110 as depicted in FIG. 1.

The processing unit 205 can receive information and instructions from other computing systems or services via the network interface 250. The network interface 250 can also store data directly to the memory 210. The processing unit 205 can communicate to and from the memory 210 and output information to the display 240 via the input/output device interface 235. The input/output device interface 235 can also accept input from the input device 245, such as a touch screen, GUI, keyboard, mouse, digital pen, microphone, mass storage device, etc. In some embodiments, a single touchscreen interface can be the input device 245 and the display 240.

The memory 210 includes computer program instructions that the processing unit 205 executes in order to implement one or more embodiments described herein. The application 230 is configured to perform some of the processes associated with the user devices 120 or the service provider devices 140 as described herein. In some embodiments, the application 230 may be executed at least partially on the processing unit 205. The memory 210 may include random access memory (RAM), read only memory (ROM), and/or other persistent, non-transitory computer readable media. The memory 210 can store an operating system 215 that provides computer program instructions for use by the processing unit 205 or other elements included in the user devices 120 and/or service provider device 140 in the general administration and operation of the user devices 120 and/or service provider devices 140. The memory 210 can further include computer program instructions and other information for implementing aspects of the present disclosure. For example, in some embodiments, the memory 210 includes an application configuration 220. The application configuration 220 may include instructions or other data for use in the execution of any of the augmented reality nail detection processes described herein, which may be executed at the processing unit 205 or application 230. In various embodiments, the application 230 and/or the application configuration 220 may be subdivided into one or more modules, such as a user profile module, a payment module, a nail polish module, an augmented reality nail recognition module, an appointment and/or calendar module, a nail salon module, or other functional blocks.

The memory 210 may also include or communicate with one or more auxiliary data stores, such as data store 255. The data store 255 may electronically store data regarding one or more users or user accounts associated with the computing device 200, or other information for execution of the application 230. As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service The elements included in the computing device 200 may be coupled by a bus 260. The bus 260 may be a data bus, communication bus, or other bus mechanism to enable the various components of the computing device 200 to exchange information.

In some embodiments, the computing device 200 may include additional or fewer components than are shown in FIG. 2. For example, a computing device 200 may include more than one processing unit 205 or memory 210. In another example, the computing device 200 may be a service provider device 140 and may not include a camera 225.

Figure 3:
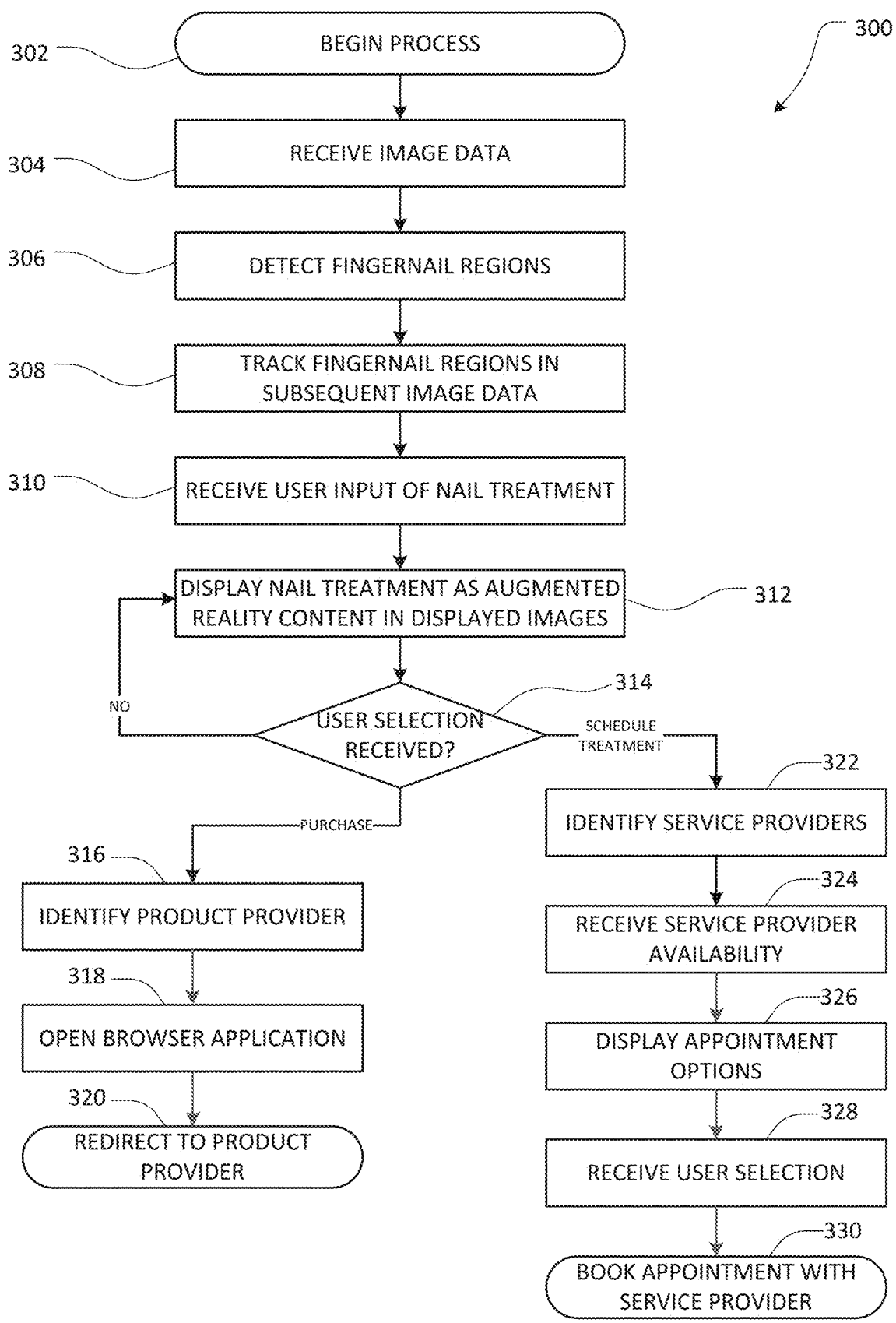
FIG. 3 is a flow diagram depicting an example method of interaction with an augmented reality nail detection system.

FIG. 3 is a flow diagram depicting an example method 300 of interaction with an augmented reality nail detection system. The method 300 may be executed at least in part by one or more computing devices, such as devices (e.g., the data center 110, a user device 120, a product provider device 130, and/or a service provider device 140) within the networked computer system 100 of FIG. 1.

In some embodiments, a user may be directed to the nail application (e.g., a mobile application that provides the various augmented reality and booking features discussed herein) via interactions with a social media site. For example, a user may browse Facebook and see a friend's post or advertisement regarding a nail design, or more generally, some artwork that the user feels would look nice as a nail design. The user may select the artwork and be redirected to the nail application to begin an augmented reality testing of one or more nail artwork designs and/or schedule treatments. In some embodiments, the social media website utilizes an API provided by the data center (e.g. the entity that coordinates the treatment booking process and provides augmented reality software to the users) so that the user can "Touch to try-on" a particular design team in social media by clicking on the design. For example, in one embodiment, in response to the user clicking on a design and social media (where the social media site has the API installed), an application installed on the user's device (e.g. the users smart phone), and account is created for the user, the user has the ability to view the design using augmented reality, and the user is able to book appointments for nail treatment, purchase products, and/or subscribe to services provided by the various service providers associated with the network.

In addition to introducing consumers to the social nail design and consumption network via a strong social media presence, such as by leveraging online celebrity clients and nail artist influencers through product driven content featuring, other channels for introduction of consumers to the artwork and nail design network include providing free accounts to esthetician schools to integrate into their curriculum as early adopters, boots on the ground sales initiatives with top tier salon down approach, and beauty trade shows/nail magazines and online advertisements.

The method 300 begins at block 302, for example, when a user opens an application such as the application 230 executing on a computing device 200 (e.g., the user device 120 of FIG. 1) as described with reference to FIG. 2. As noted above, a user may be introduced to the application and/or automatically redirected to the application (e.g., through an API executing on a social media site) via many different media channels and mediums.

Figure 7:
FIGS. 7-13 are example screens of an example graphical user interface for facilitating selection of nail treatments within an augmented reality nail detection system.

At block 304, image data is received. For example, the user device 120 and/or an application executing on the user device 120 may receive image data from a camera 225 or other image capture device of the user device 120. In various embodiments, the image data may be one or more single image frames, video image data, or the other image data. The image data may include one or more images of a hand of the user or another hand within an imaging area of the image capture device. For example, the image data may include one or more images of the back of the user's hand and fingers, including one or more of the user's fingernails. In one example, the image data acquisition at block 304 is illustrated in the screen of FIG. 7.

At block 306, the application 230 detects one or more fingernail regions within the image data. Detection of fingernail regions may be performed at the user device 120, at the data center 110, and/or by a combination of processing resources of the user device 120 and the data center 110. In one example, the detection of fingernail regions may be accomplished by an automated system for detecting and tracking fingernail from images and/or video collected with the camera 225 of the computing device 200 (e.g., user device 120). In some embodiments, detection may be accomplished using one or more machine learning implementations, such as a convolutional neural network (CNN) or the like. Fingernail detection within image data is discussed in greater detail below. Depending on the embodiment, the fingernail detection models may be generated using various techniques, such as machine learning techniques that may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as anchor points of nails, fingers, etc.

The identified fingernail regions may be represented by a set of 1, 2, 3, 4, 5, 6, 7, 8, 9, 10, or more data points such as (x,y) coordinates within the image data. A set of data points identifying each fingernail region may be stored at the user device 120 (e.g., in a memory 210 and/or a remote data store 255) and/or at the data center 110 (e.g., in the database 114). In some embodiments, coordinates are an array of objects (fingers) each consisting of multiple x and y coordinates (the boundaries of the nail). Once the nails are detected, the application may get an array from the library embedded in the application responsible for fingers and nails detection. Each element in the array may include a series of coordinates of a specific nail. These series or arrays of coordinates may each be the x and y values for the boundary of a nail. Using AR core library, the application may draw and overlay a specific filter given by the user on the nail while passing the coordinates. AR core accepts a polygon as an input to draw on the scene. The application may gather all the coordinates for a nail, and create a polygon and pass it afterwards to the AR core library. After that, the application may pass the filter and mesh details along the polygon created before to AR core for painting and drawing. This process may be repeated for all the other nails/elements of the array.

At block 308, the fingernail regions identified at block 306 are tracked in subsequent image data. Subsequent tracking of fingernail regions across subsequent frames of image data may enable real-time viewing of virtual nail treatments as augmented reality content, and may allow the virtual nail treatments to follow the user's fingernails as the user's hands move relative to the image capture device. In some embodiments, multiple blocks occur concurrently or substantially concurrently. For example, in one embodiment blocks 302, 304, 306, 308 may occur concurrently.

At block 310, user input corresponding to one or more nail treatments is received. The user input at block 310 may correspond to, for example, selection of one of a plurality of options of nail treatments to virtually try on. In some embodiments, the user input comprises selection of one or more nail treatment parameters such as a nail shape, nail length, nail polish color or combination of colors, a commercially available nail treatment product, or other parameter. The user input at block 310 may be received through a graphical user interface such as a graphical user interface of the application 230, for example, as illustrated in the screens of FIGS. 10-13.

At block 312, the application 230 displays a nail treatment corresponding to the user input of block 310, as augmented reality content in displayed images. For example, the application 230 may cause the display 240 of the user device 120 to overlay images of the user's selected nail treatment onto real-time video data from the camera 225 at locations corresponding to the fingernail regions identified at block 306 and tracked in block 308. In some embodiments, the virtual nail treatments may change in size, shape, orientation, hue, brightness, etc., as the fingernail regions move within the image frames (e.g., as the user moves the user's hand laterally, closer to the camera, farther from the camera, rotates the hand and/or fingers, etc.). In some embodiments, the application may automatically select one or more nail treatments similar to a nail treatment selected by user and provide augmented reality images of multiple nail treatments on the user's finger concurrently. For example, the display may be segmented into nine (or any other quantity of) windows each, each illustrating the user's finger with a different nail treatment. Thus, the user can obtain a very efficient overview of available designs and select a most desired design.

At decision state 314, a user selection may be received. If it is determined at decision state 314 that a user selection has not yet been received, the method 300 returns to block 312, and the virtual nail treatment corresponding to the user input of block 310 continues to be displayed on the real-time image data. If a user selection is received at decision state 314, the user selection may correspond to a request to purchase one or more products corresponding to the virtual nail treatment and/or a request to schedule an appointment to have a corresponding physical nail treatment applied to the user, such as at a nail salon or other service provider. The user selection may be made, for example, by providing a user input at the screens of FIGS. 8, 9, and/or 14.

If it is determined at decision state 314 that the user has selected an option to purchase one or more products reflected in the virtual nail treatment, the method 300 continues to block 316, where one or more product providers are identified. For example, the product provider may correspond to a manufacturer and/or a particular product, shade, etc. of the product from the manufacturer. The system may further identify one or more product providers, such as an internet-based retailer or other entity from which the user is able to order the product. In some embodiments, the data center 110 may store information corresponding to available inventory held by one or more product providers of products provided as virtual nail treatments within the application 230.

At block 318, the application 230 causes the user device 120 to open a browser application. At block 320, the method 300 terminates as the browser application executing on the user device 120 is redirected to a website corresponding to the product provider. For example, the browser application may be redirected to a page of the product provider site corresponding to the identified product and/or brand to enable the user to purchase the product without requiring the user to independently search for the product.

Returning to decision states 314, if it is determined that the user has selected an option to schedule an appointment, the method 300 continues to block 322. At block 322, the application 230 identifies one or more service providers corresponding to the user's selected nail treatment. For example, the one or more service providers may be nail artists, nail salons, beauty salons, spas, or any other service providers participating with the system 100. In some embodiments, participating service providers may periodically provide information to the system 100, (e.g., through a service provider-specific application 230) corresponding to product inventory, specific treatments, or other services available from the service provider. The one or more service providers identified at block 322 may be identified based on one or more of service provider inventory information, location information of the service providers, location information of the user, etc.

At block 324, service provider availability information is received. In some embodiments, the application 230 may request availability (e.g., available appointment times, etc.) from the data center 110 and/or from the one or more service provider devices 140 corresponding to the service providers identified at block 322.

Figure 17:
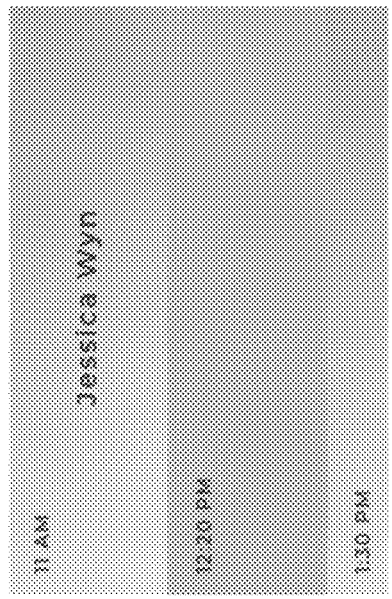
Figure 16:
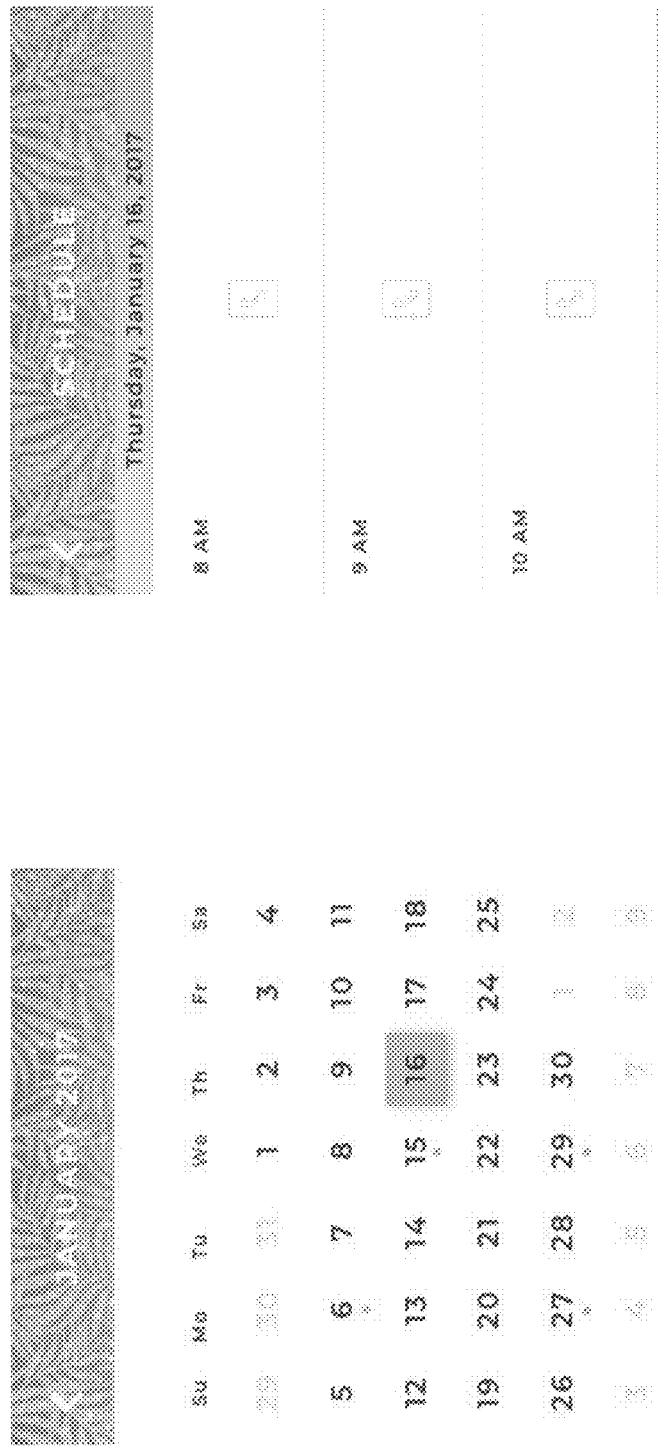

At block 326, available appointment options are displayed to enable a user to select an available appointment to have the selected treatment applied. FIGS. 16 and 17 illustrate example graphical user interface screens for displaying appointment options to a user. At block 328, a user selection of an appointment time and service provider is received. At block 330, the corresponding appointment is booked with the service provider, for example, by causing the data center 110 to send a message to an application 230 executing on the service provider device 140 corresponding to the selected service provider. In some embodiments, the method 300 may further include steps such as sending a notification to the user device 120 confirming the booking of the appointment, initiating a messaging session between the user device 120 and the service provider device 140, and/or opening a mapping application to display a location corresponding to the service provider.

With reference to FIGS. 4-36, example graphical user interface screens implementing various functions of the system 100, such as the method 300, will be described. The graphical user interface screens of FIGS. 4-36 may be displayed, for example, on a display 240 of a computing device 200 such as a user device 120 or a service provider device 140, by one or more applications such as the application 230.

From an artist's perspective, the same or similar mobile application may be used to provide designs that are viewable by users, purchasable, and receive payment through an established financial account linked with the mobile application. For example, an artist may install the nail application, create an account (e.g., indicating that the user is an artist wanting to provide designs for purchase, rather than a consumer looking to browse designs for purchase), the artist may purchase rights to publish artwork in the application (e.g., either a per use fee, subscription, or other payment model), and then may provide (e.g. through taking photographs, uploading, or creating on the device itself) artwork that then becomes viewable by consumers. Additionally, the application may automate appointment booking for artists that also provide nail treatment services and provide an interface to pay the artist for artwork that is sold.

Figure 4:
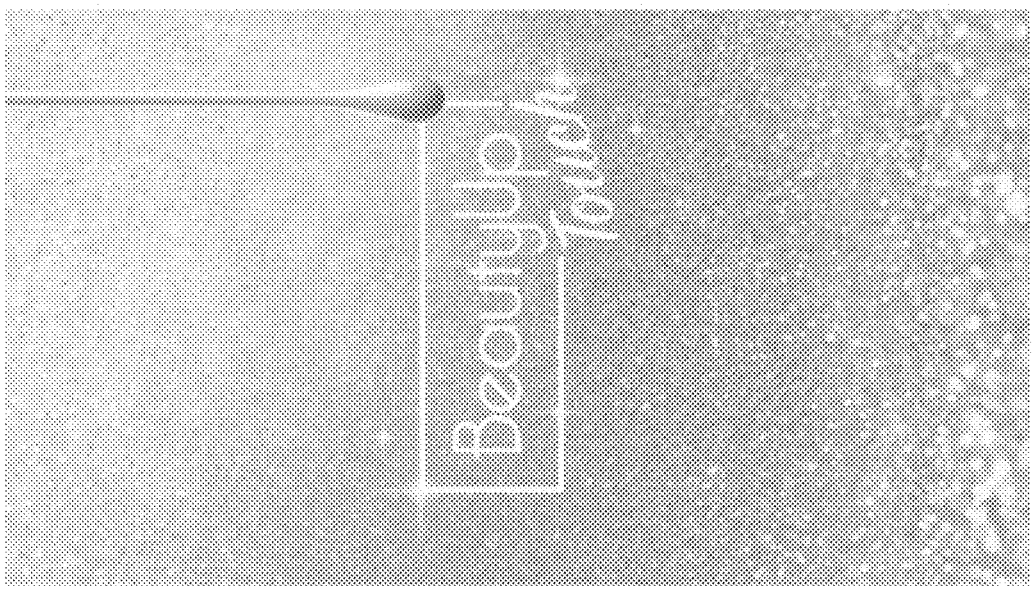

FIG. 4 illustrates an example introductory or splash screen displayed upon opening of the application. The splash screen may provide visual content to a user of the computing device 200 informing the user that the augmented reality nail detection application 230 is opened.

Figure 5:
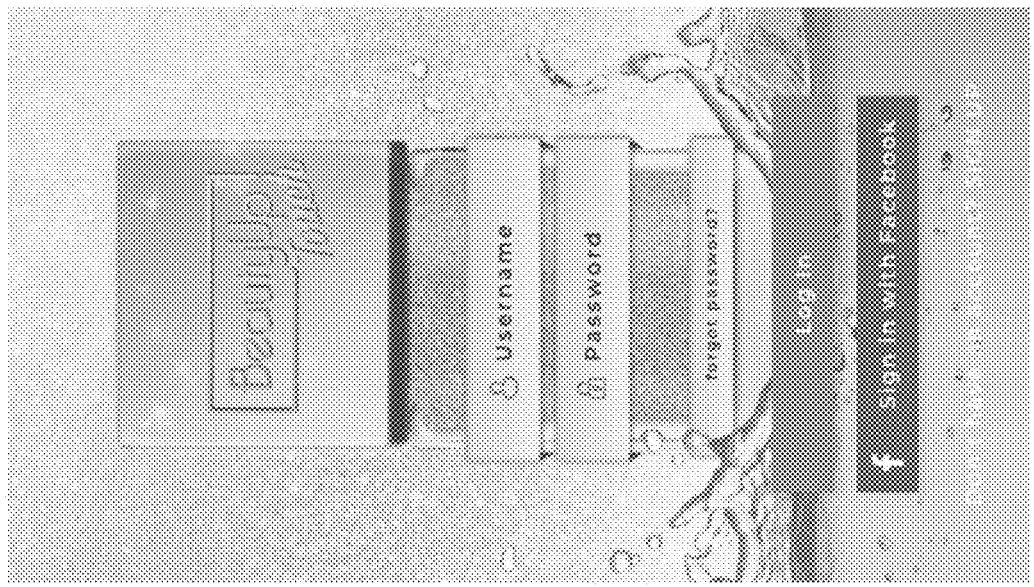
FIGS. 4-6 are example screens of an example graphical user interface for user authentication with an augmented reality nail detection system.

FIG. 5 illustrates an example login screen in which a user may input one or more credentials, such as a username and password to enable connection between the application 230 on the computing device 200 and one or more items of account information (e.g., preferences, history items, etc.) stored at the data center 110, such as in the database 114. In some embodiments, the login screen may further enable account authorization based on connection with an existing account from another service such as a social network or the like. The credentials provided at the login screen may be verified based on comparing the provided credentials to one or more credentials stored at the data center 110, such as in the database 114.

Figure 6:
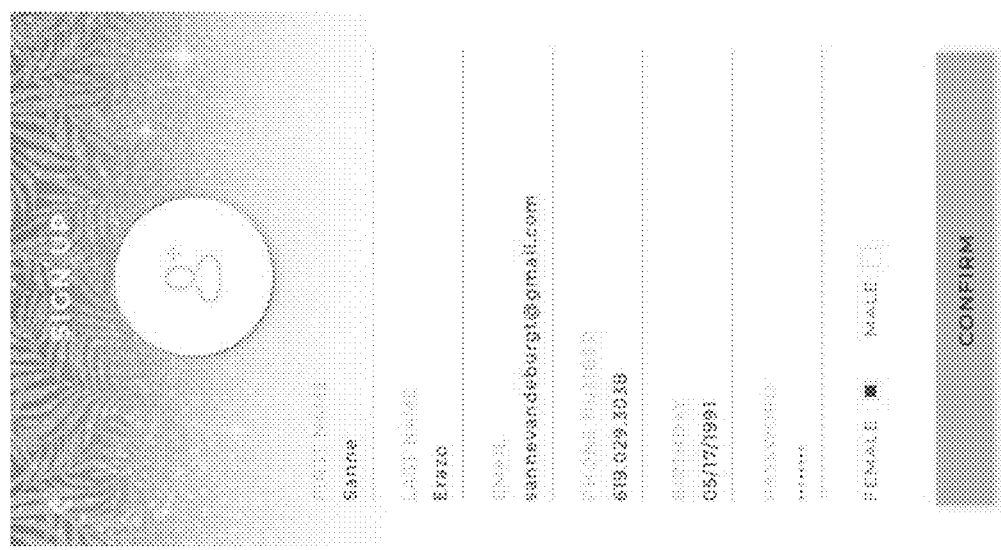

FIG. 6 illustrates an example sign-up screen in which a user may input one or more items of user information to set up a new account with the application 230. In some embodiments, the sign-up screen may be displayed, for example, on the first time the application 230 is opened after installation on the computing device 200, and/or in response to a user selecting a "sign up" option, such as on the login screen or another screen of the application 230.

FIGS. 7-13 are example screens of an example graphical user interface for facilitating selection of nail treatments within an augmented reality nail detection system. FIG. 7 is an augmented reality nail recognition screen. In some embodiments, the screen of FIG. 7 may serve as a home page for the application 230. The screen of FIG. 7 may be displayed while the nail detection algorithm captures image data and identifies features within the image data corresponding to the user's fingernail regions. The augmented reality nail recognition screen and/or home page of FIG. 7 may further include one or more options to select features such as color, nail shape, or the like, for one or more virtual nail treatments to be applied within the application 230.

Figure 9:
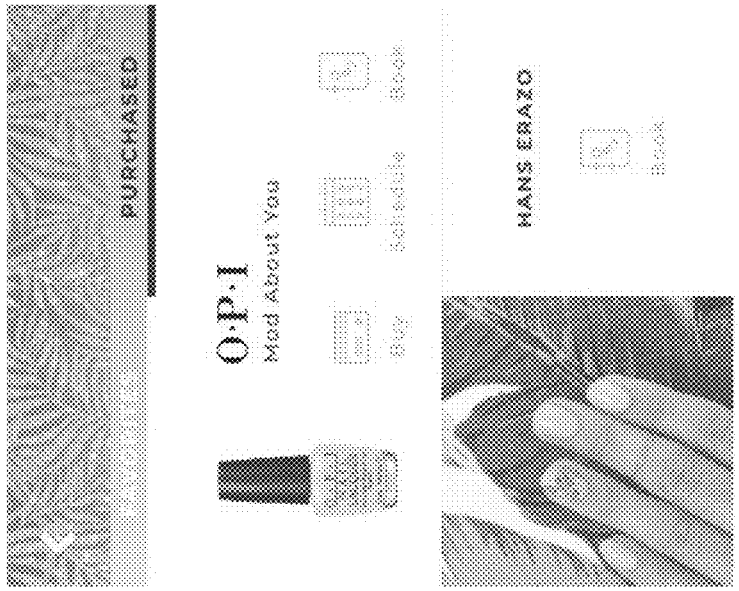
Figure 8:
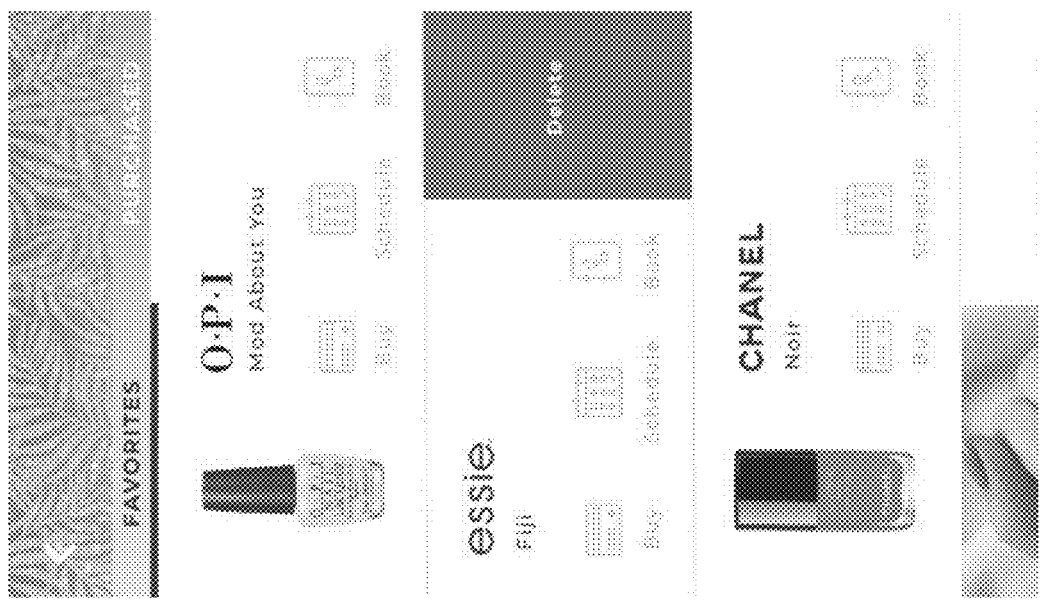

The screens of FIGS. 8 and 9 allow a user to select one or more nail treatment options based on historical usage by the user. FIG. 8 illustrates a "favorites" screen that displays one or more items selected as favorites by a user, added to a list of favorites based on frequent selection, or based on one or more other criteria. In some embodiments, each item within the favorites screen may include corresponding options to buy the corresponding product, schedule an appointment to have the product applied, and/or search for a nearby nail artist or salon corresponding to the product using a mapping application. FIG. 9 illustrates a "purchases" screen that displays one or more items that the user has previously purchased in association with the application 230 and/or for which the user has completed an appointment in association with the application 230. The items displayed in the purchases screen may similarly include the buy, schedule, and search options described above with reference to FIG. 8.

Figure 10:

FIG. 10 illustrates a variation of the augmented reality nail recognition screen of FIG. 7, in which a user has selected a "nail shapes" option, such as by tapping or swiping a graphical user interface item on the screen of FIG. 7. The screen of FIG. 10 displays one or more options for selecting the shape and/or length of the nails displayed as virtual nail treatments. In the example screen depicted in FIG. 10, a plurality of shapes such as square, oval, round, oval, almond, coffin, stiletto, ballerina, or other options are displayed as selectable items at the bottom of the screen such that the user can toggle between nail shapes in real time within the augmented reality display. Quantitative features such as nail length may be selectable by a slider such that the user can adjust the length or other aspect of the virtual nail treatment in real time within the augmented reality display.

Figure 11:
Figure 13:
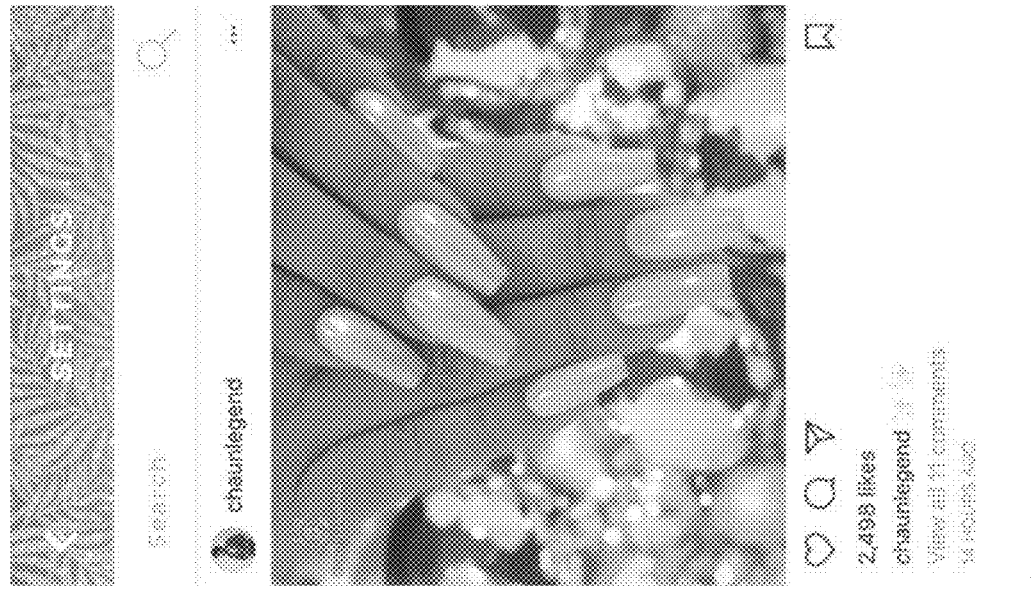
Figure 12:

FIG. 11 illustrates an example "trends" screen in which one or more catalogued photographs of possible nail treatments are displayed for user selection. In some embodiments, some or all of the nail treatments displayed on the trends page may be available for application as a virtual nail treatment and/or for purchase or booking at a service provider. The images displayed on the trends page may be selected automatically by the application 230, for example, based on images the user has recently interacted with, images the user has interacted with for at least a threshold time, and/or one or more estimated user preferences determined based on the images the user has interacted with. Similarly, FIG. 12 is a "brands" screen that displays a plurality of brand options to assist the user in selecting virtual nail treatments. FIG. 13 illustrates a "news" screen, which provides a feed of brands, trends, salons, nail artists, nail consumers, etc. The entities selected for the news screen may be determined, for example, based on entities selected by the user to follow or otherwise interact with.

Figure 14:
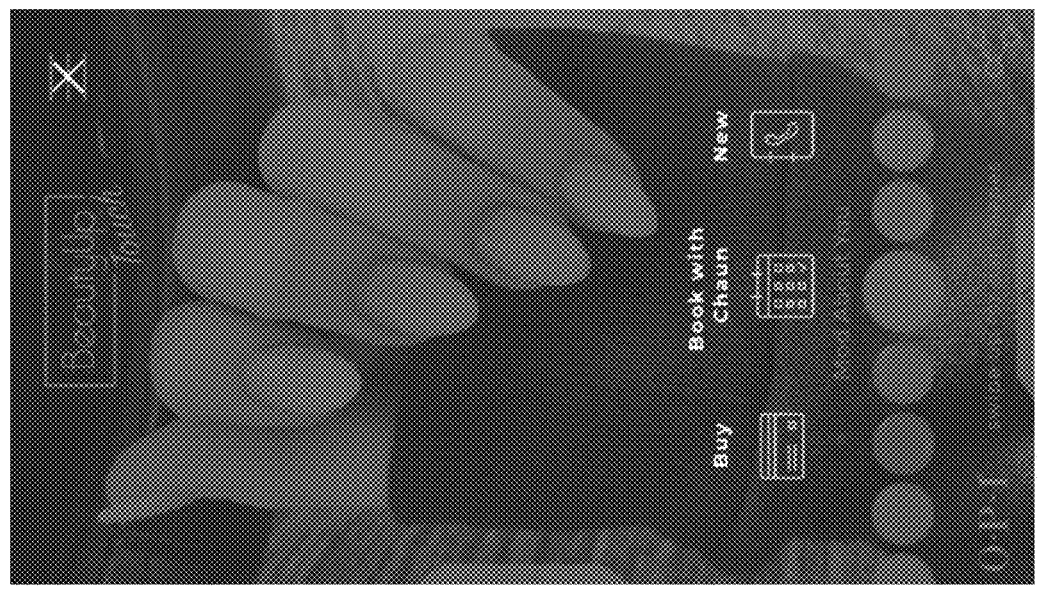

FIGS. 14-22 are example screens of an example graphical user interface for facilitating interactions between a user and one or more product or service providers associated with a selected nail treatment. FIG. 14 illustrates an example augmented reality image capture screen. The application 230 may display the image capture screen of FIG. 14, for example, based on a user confirmation. For example, the user may position the hand such that the selected nail treatment is visible within the image data displayed, and may provide confirmation such as by selecting a confirmation software button, tapping the selected nail color again, etc. The user confirmation may cause the application 230 to capture and save the currently displayed image data as a still image. The application 230 may further capture nail treatment data such as brand, color, nail style, and nail length, and may store the nail treatment data in association with the captured still image. After receiving the user confirmation, the screen of FIG. 14 may display options such as user-selectable options to buy products corresponding to the treatment, book an appointment to receive the treatment with a known or previously selected service provider, and/or search for a different service provider to provide the treatment. In some embodiments, display of the image capture screen may correspond to decision state 314 of method 300, and a user selection of one of the buy or search options may correspond to receipt of a user selection at decision state 314 of method 300.

Figure 15:
FIGS. 14-22 are example screens of an example graphical user interface for facilitating interactions between a user and one or more product or service providers associated with a selected nail treatment.

FIG. 15 illustrates an example screen of a browser application, for example, as may be displayed at block 320 of method 300 after the browser application is launched and redirected to a page at which the user may purchase the selected product (e.g., a nail polish or the like). Although FIG. 15 depicts an embodiment in which the browser is redirected to a website corresponding to the product manufacturer, the browser may alternatively be redirected to a website of a third-party retailer selling products from a plurality of manufacturers.

FIGS. 16 and 17 illustrate example screens displaying appointment options as described above with reference to block 326 of method 300. The user may select a desired calendar date for the nail treatment in the screen of FIG. 16, and may select an available time slot for the treatment in the screen of FIG. 17. When the user selects a time slot in the screen of FIG. 17, the appointment may be booked, for example, by a communication between the data center 110 and a service provider device 140.

Figure 18:
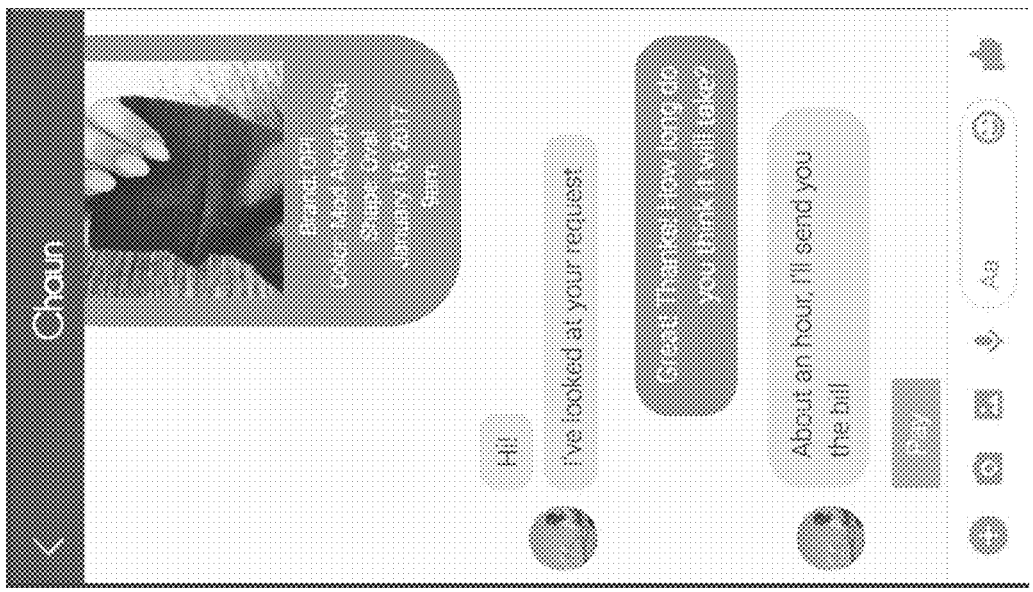

In some embodiments, selection of an appointment time may further cause initiation of a messaging session between the user device 120 and the service provider device 140, as shown in the example screen of FIG. 18. Messaging functionality as shown in FIG. 18 may be implemented within a messaging function of the augmented reality nail detection application itself, and/or through an independent messaging application executing on the computing device 200. In some embodiments, an initial message is automatically sent to the service provider, the message comprising one or more of the images captured at the augmented reality image capture screen, brand and/or color information corresponding to a selected nail polish option, a selected nail shape and/or size, an appointment date, an appointment time, and/or other information associated with the selected nail treatment and/or appointment.

Figure 19:
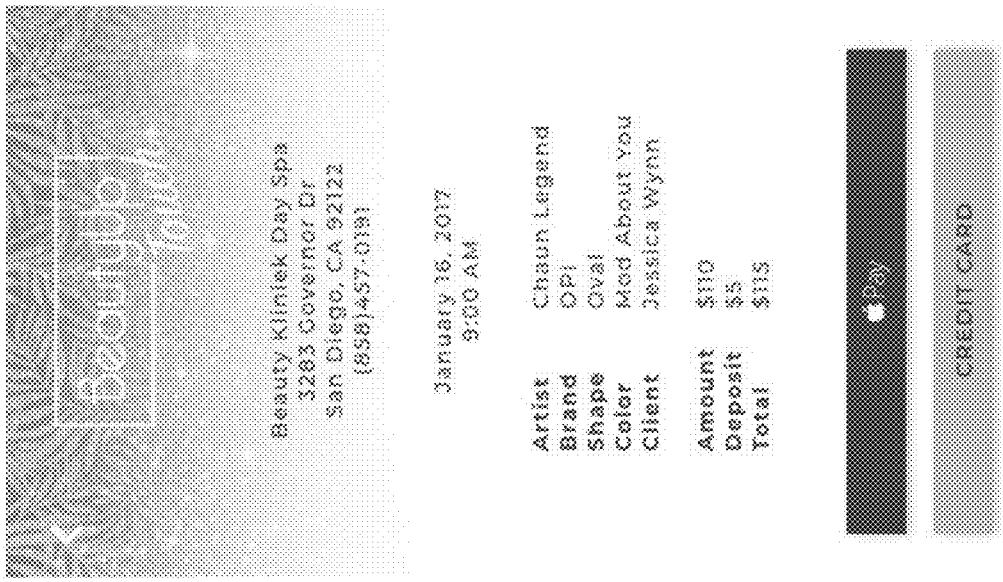
Figure 20:
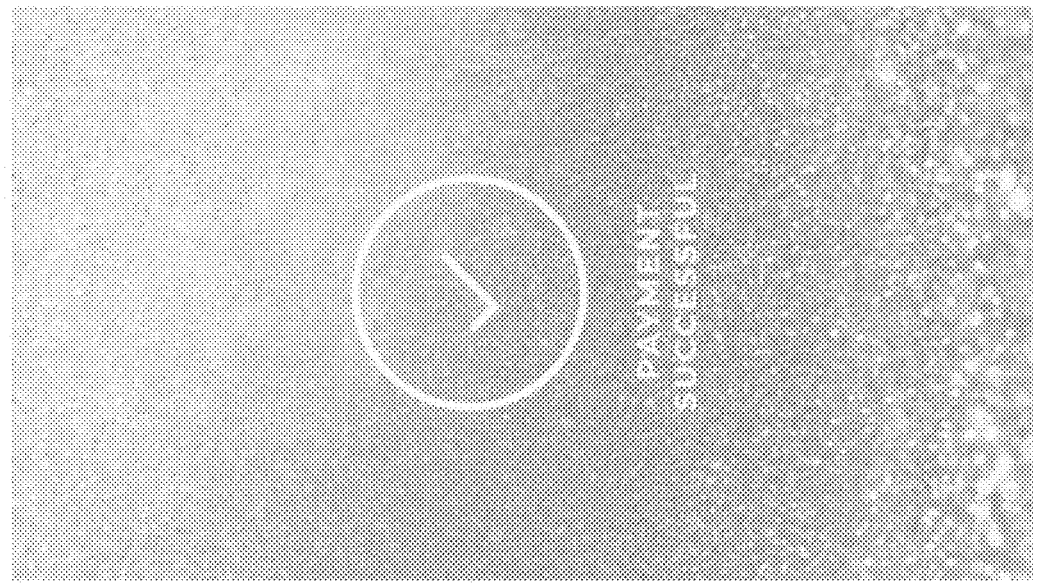

The application 230 may further accommodate billing for appointments within the application. FIG. 19 illustrates an example billing screen, which displays one or more transaction information items, such as a location or other information of the service provider, a date and/or time of the appointment, an artist, a nail polish brand and/or color, a nail shape, a nail size, a client name, and financial information corresponding to a price or estimated price of services to be rendered. The billing screen may accommodate prepayment, payment after the appointment, submission of a deposit in advance of the appointment, and/or payment through one or more separate billing methods or billing service providers. The screen of FIG. 20 illustrates an example billing confirmation screen, for example, based on successful receipt of payment by the service provider.

Figure 21:
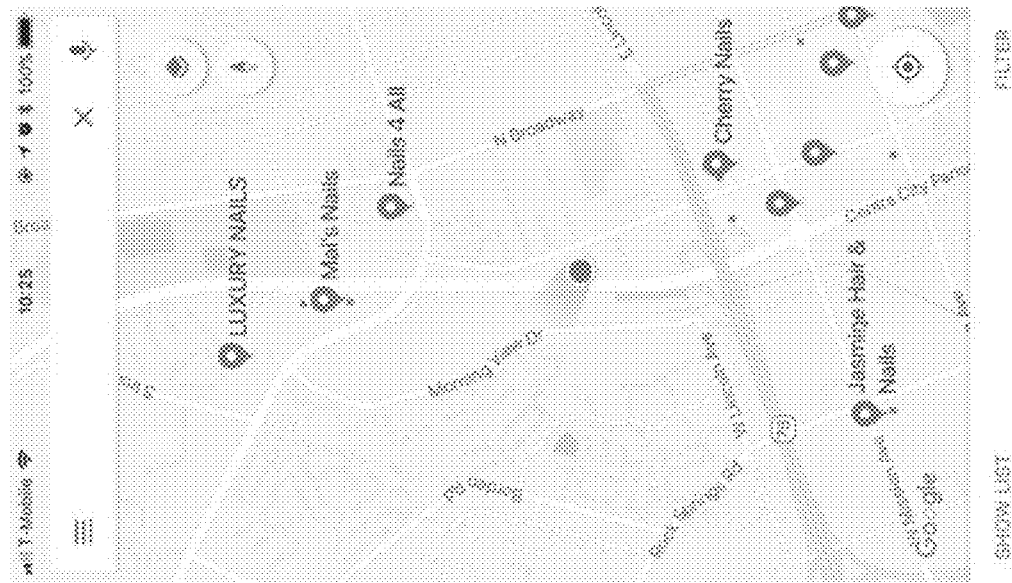
Figure 22:
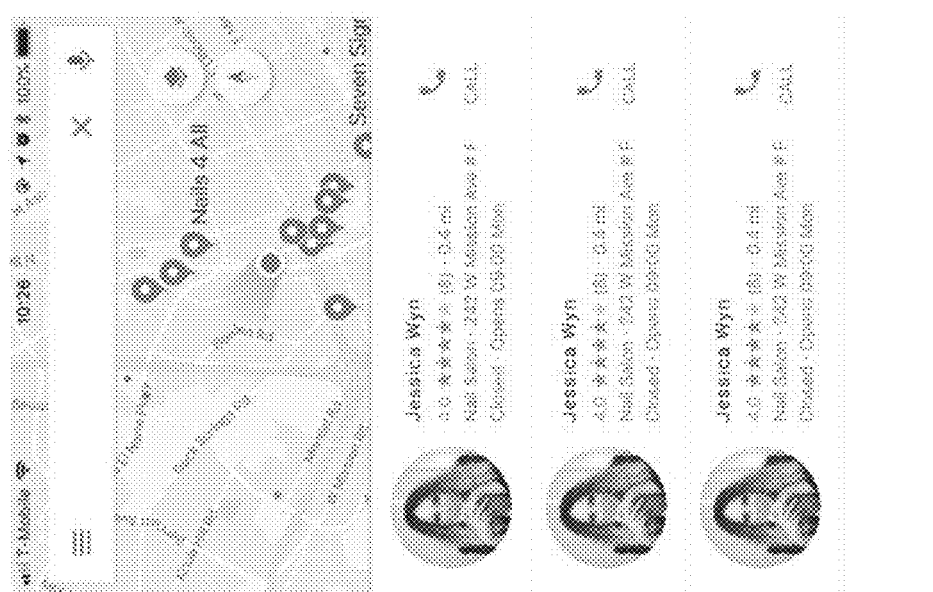

FIGS. 21 and 22 are screens illustrating example mapping-related functions. FIG. 21 illustrates a screen in which a user device's mapping application may be launched and directed to highlight service providers within close proximity to the user's current location or address. In some embodiments, the screen of FIG. 21 may be triggered based on receiving a selection of the "new" option from the screen of FIG. 14. As shown in FIG. 22, a list of the service providers displayed in the map of FIG. 21 may further be provided.

Figure 23:

FIGS. 23-26 are example screens of an example graphical user interface for modifying one or more settings associated with a user of an augmented reality nail detection system. FIG. 23 illustrates a user profile home screen providing options for a user to access the user's profile, booked appointments, messages, and/or other settings. In some embodiments, the profile home screen may further include an option to switch to an application functionality for service provider use, as described below with reference to FIGS. 27-36.

FIG. 24 illustrates an example user profile screen. On this screen, the user has the ability to change or edit the user's profile photo, edit contact information, and/or edit or upload nail images. The user profile screen may further provide an overview of account information such as a number of shared images, a number of followers, other users the user is following, etc. In some embodiments, nail images uploaded by the user to the user profile may be viewable by other users.

Figure 26:
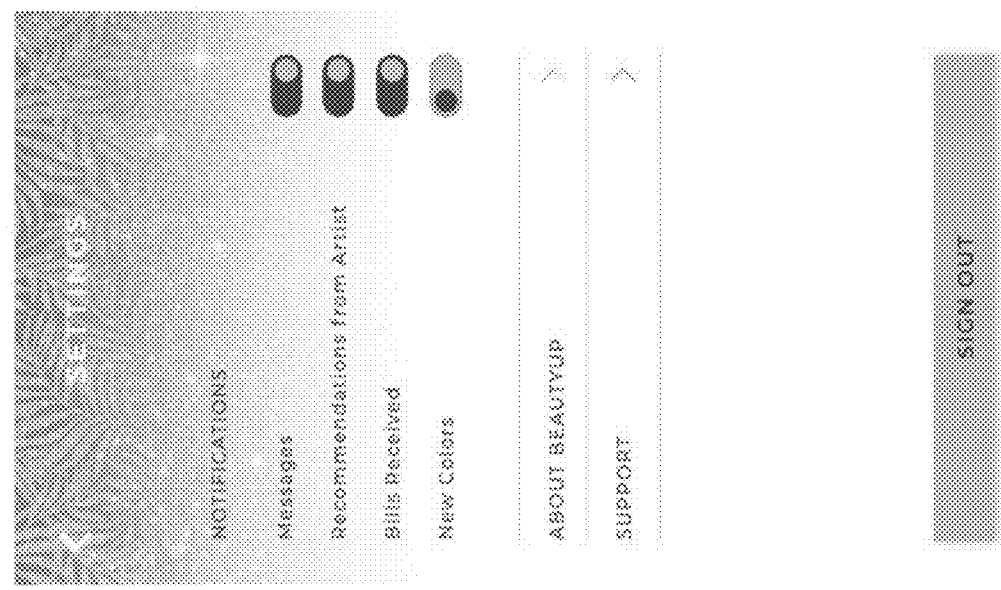
Figure 31:
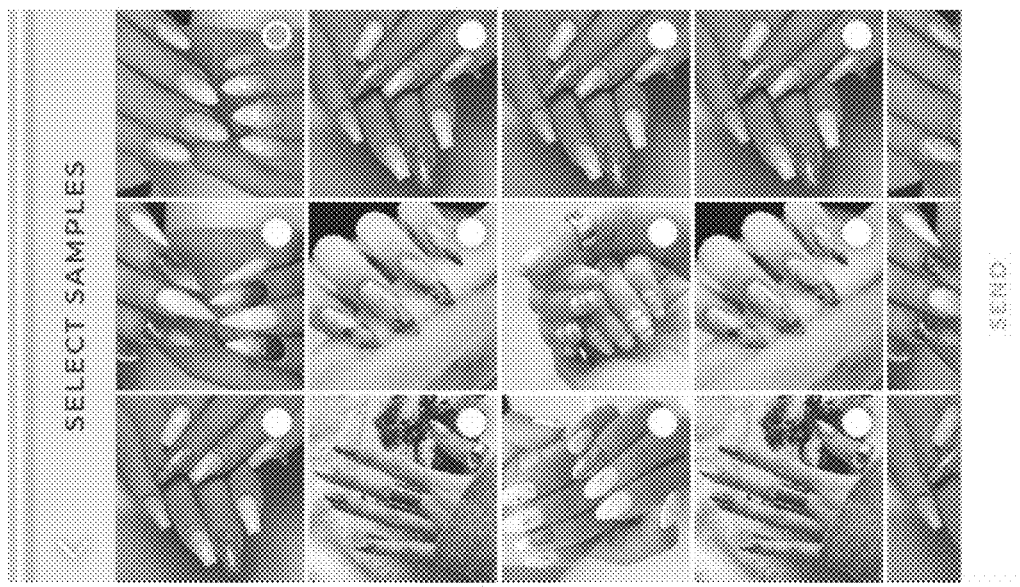
Figure 30:
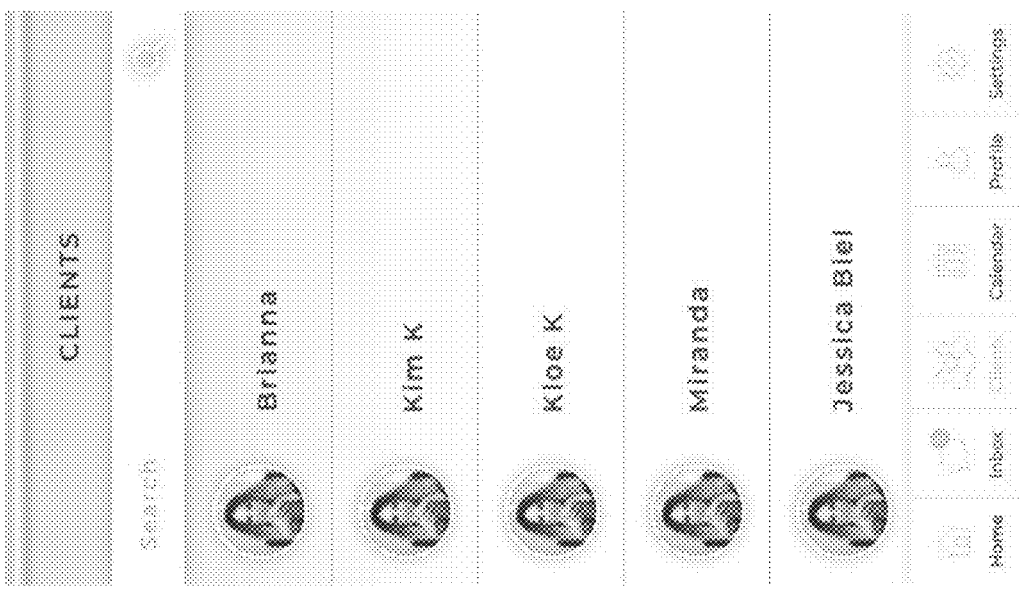

FIG. 25 illustrates an example screen displaying all confirmed and/or pending appointments the user has booked or requested through the application 230. The user may select a confirmed or pending appointment to see further details regarding the appointment. In some embodiments, the screen of FIG. 25 may further enable the user to cancel and/or edit one or more details of a pending or confirmed appointment. FIG. 26 is an example settings screen in which a user can select and/or change one or more settings for the application 230, such as notification settings, and may access further information and/or customer support services.

Figure 27:
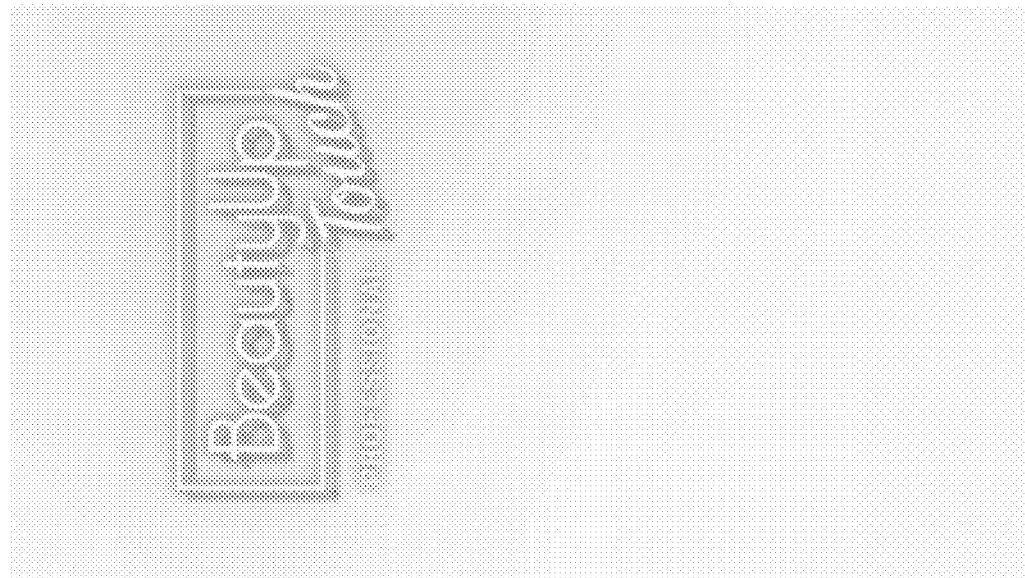

FIGS. 27-36 are example screens of an example graphical user interface for facilitating interactions between a service provider and one or more users of an augmented reality nail detection system. The screens of FIGS. 27-36 are illustrated as examples of "professional" functionality configured for use by service providers rather than by users. In some embodiments, the professional functionality may be unlocked for application users based on verification as a service provider, etc. FIG. 27 is a splash screen which, when displayed, indicates to a user of the computing device 200 that the application 230 is entering the service provider functionality.

FIG. 28 is an example service provider home screen, displaying upcoming appointments that have been booked with the service provider. The screen of FIG. 27 may enable the service provider to schedule, reschedule, and/or remove one or more scheduled appointments. Scheduling, rescheduling, or removing of an appointment may further cause a notification (e.g., SMS, email, in-app notification, etc.) to be sent to the user device corresponding to the scheduled, rescheduled, or removed appointment. FIG. 29 illustrates a further example of a scheduling screen, in which a service provider may allocate one or more available appointment times to a client. The client may correspond to a user of a user device 120 in the system 100, and/or may be a client that is not a user of the system 100. Where the client is a user of the system 100, the example "clients" screen illustrated in FIG. 30 may be provided to enable the service provider to select from a list of known clients. In some embodiments, the clients screen may be populated with some or all of the users of the system 100 that follow or otherwise subscribe to publications of the service provider within the application. In some embodiments, individual users listed in the clients' screen of FIG. 30 may further be associated with a set of sample images, as shown in the example screen of FIG. 31, selected by and/or selected automatically for the user, for example, as described above with reference to FIGS. 11-13.

Figures 32, 33:
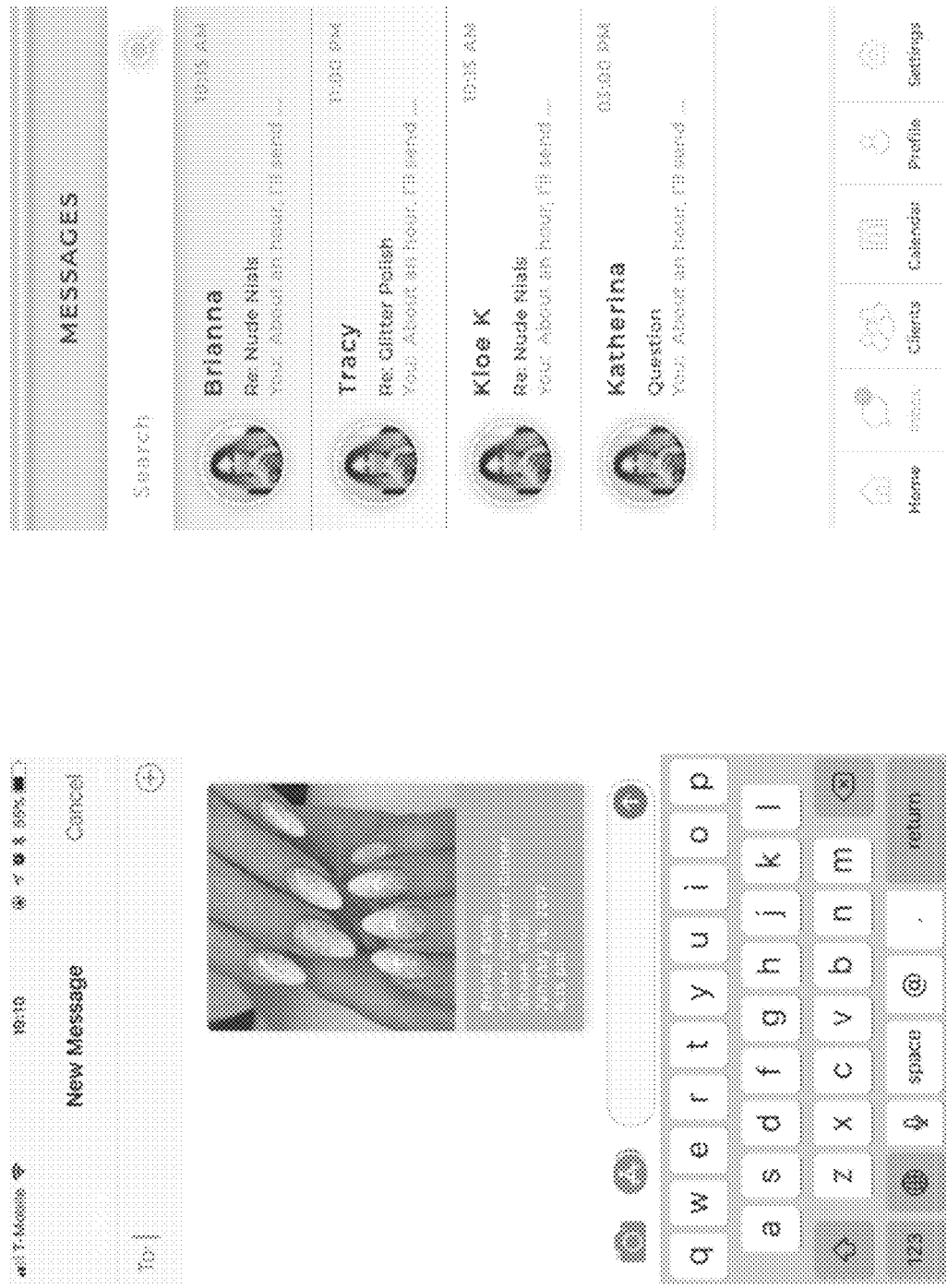
Figure 35:
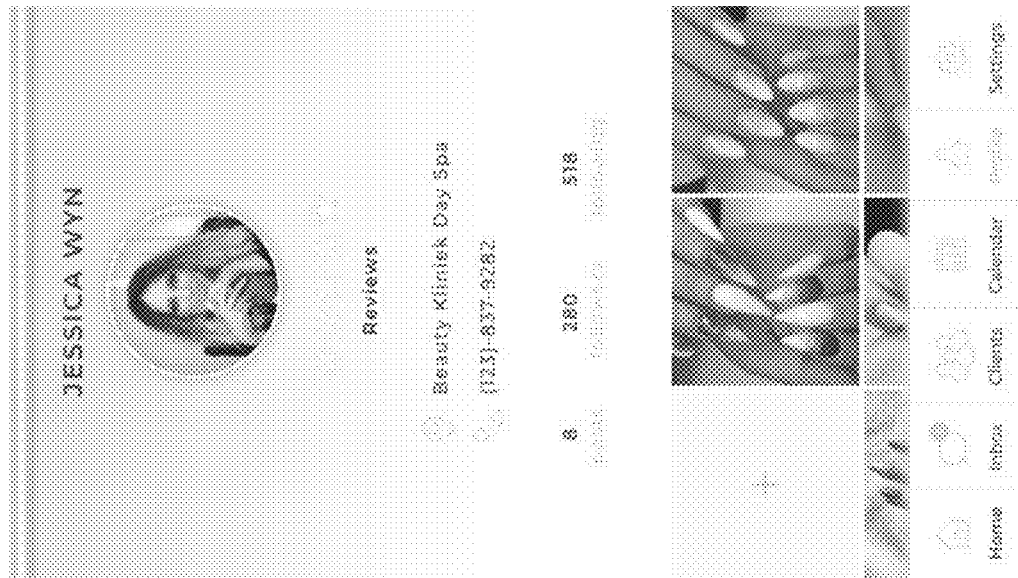
Figure 34:
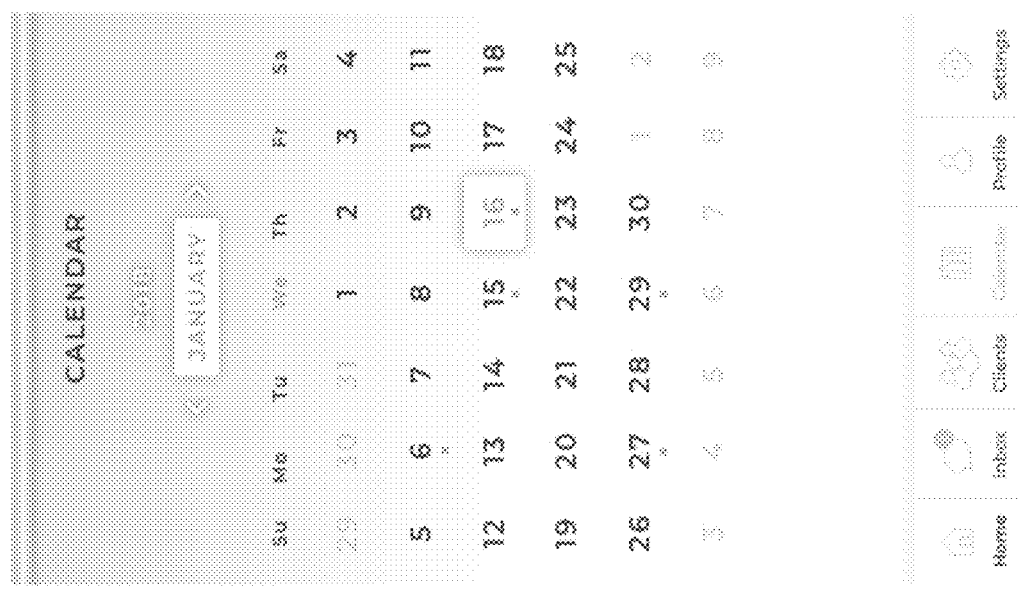
Figure 36:
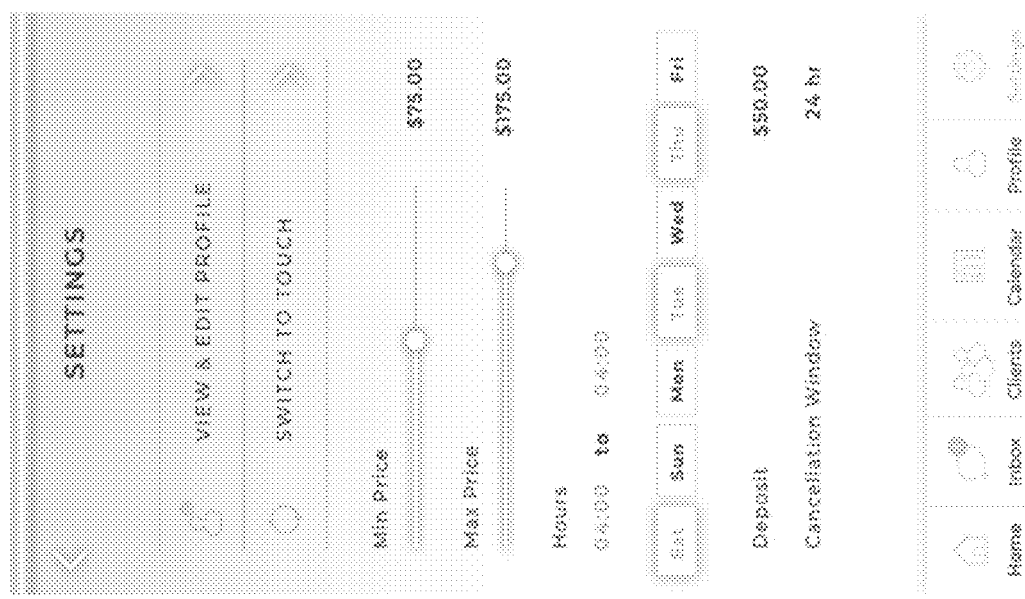

FIGS. 32-34 illustrate example messaging and appointment scheduling screens for use by service providers within the application 230. FIG. 35 illustrates an example service provider profile screen, in which the service provider may view contact information, ratings, reviews, etc. corresponding to the service provider, in addition to one or more of the information items described above with reference to FIG. 24. FIG. 36 illustrates an example service provider settings screen, which may allow the service provider to select one or more setting options such as available appointment times, appointment price ranges, daily or weekly hours, advance deposit requirements for appointment bookings, cancellation policies, or the like.

Provided below is an example architecture and method of machine learning for fingernail detection and tracking. In one embodiment, the nth frame from a video stream is normalized to a j×j intensity image. This is the input to a fully connected layer, followed by k pairs of convolution and RELU layers. Each pair is separated by one max-pooling layer. The output from the last pooling layer may then be flattened, the resulting vector is fed to a fully connected layer, and it is filtered with a softmax activation function. This last operation identifies those pixels that are most likely to contain fingernails.

The CNN may then find fingernail-pixels at a rate of 15 frames per second. A Kalman (or other) smoother may be used to increase detection rate to 30 fps. Once each pixel is classified as with/without fingernail, separate fingernails are identified by edge detection. Four coordinates are returned for each fingernail present in a frame.

In one embodiment, the model may be trained using a dataset divided into multiple subsets, such as three subsets including a training, validation, and testing subset. The network may then be initialized using the parametrization from Google fingernail-detection machine.

Fast nail detection with Boosting (FNDB): Each frame i is normalized to a j×j intensity image. The image is filtered using a bank of k 2-dimensional Gabor filters. The outcome of each convolution is compiled in a $j^2 \times k$ matrix. The $j^2 \times 1$ target vector was compiled using Google fingernail-detection model. We used simple adaptive boosting to select the k* most informative Gabor filters. This procedure reduces the size of the test matrix to $j^2 \times k^*$.

FNDB finds fingernail-pixels at a rate of more than 15 frames per second.

Nail-polish application: Using the 4-point representation of each nail.

In addition to the Nail Detection Technology, in some embodiments the frame rate in which finger nails are detected is increased by taking the output of the neural network and passing it to a common smoother.

Overview of Certain Advantages and Features

Provided below are several advantages and features of certain embodiments of the augmented reality systems and devices discussed herein. These advantages and features may be used separately in certain implementations or combined in any manner in other implementations.

Full motion, real-time video, Augmented Reality Nail Detection Technology
Process of trying on nail designs using AR and booking selection directly from the image to a nail artist/salon/provider
Trying on intricate nail designs (not basic solid polish colors)
Toggling and/or customizing nail shape & length
Process for licensing an artists' design to another
User Interfaces In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Notification Module

In some embodiments, alerts and/or notifications are automatically transmitted to the user device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

What is claimed is:

1. A system comprising:
one or more client applications executable by respective communication devices, each communication device comprising one or more processors in communication with an image capture device, the one or more processors configured with processor-executable instructions included in the client application to perform operations comprising:

receiving, from the image capture device, frames of image data obtained at the image capture device, the image data including a finger of a user;

detecting, within individual frames of the image data, a fingernail region of the finger, the fingernail region comprising a plurality of pixels corresponding to an imaged fingernail of the image data;

identifying, within subsequent frames of the image data, the fingernail region, wherein the fingernail region in subsequent frames is positioned differently than in previous frames based on movement of the image capture device and/or finger of the user; and display, on a display of the communication device,
augmented reality images comprising the subsequent frames of the image data overlaid with a virtual nail treatment occupying at least a portion of the one or more fingernail regions, wherein the augmented reality images depict movement of the finger and fingernail while maintaining the virtual nail treatment on the fingernail region; and an identifier of the virtual nail treatment, the identifier selectable to initiate communication with a networked resource at which one or more products corresponding to the virtual nail treatment are available for purchase.

2. The system of claim 1, wherein the one or more processors are further configured with processor-executable instructions included in the client application to transmit, in response to selection of the identifier, request information associated with the virtual nail treatment identification information.

3. The system of claim 2, further comprising a server comprising one or more processors configured with processor-executable instructions to perform operations comprising:

receiving, via a network, the request information from the communication device;

identifying, based at least in part on the request information, the networked resource; and transmitting, via the network, a response to the communication device, the response comprising an identifier of the networked resource.

4. The system of claim 1, wherein the one or more processors of the communication device are further configured with processor-executable instructions included in the client application to perform operations comprising:

causing the communication device to execute a browser application; and causing the browser application to navigate to the networked resource.

5. The system of claim 1, wherein the one or more processors are further configured with processor-executable instructions to perform operations comprising storing, in a data store associated with the communication device, user profile data corresponding to the identifier of the virtual nail treatment.

6. The system of claim 1, wherein the displayed identifier of the virtual nail treatment comprises an identifier of the one or more products.

7. The system of claim 1, wherein the one or more products comprise one or more physical nail treatment products.

8. A system comprising:

one or more client applications executable by respective communication devices, each communication device comprising one or more processors in communication with an image capture device, the one or more processors configured with processor-executable instructions included in the client application to perform operations comprising:

receiving, from the image capture device, frames of image data obtained at the image capture device, the image data including a finger of a user;

detecting, within individual frames of the image data, a fingernail region of the finger, the fingernail region comprising a plurality of pixels corresponding to an imaged fingernail of the image data;

identifying, within subsequent frames of the image data, the fingernail region, wherein the fingernail region in subsequent frames is positioned differently than in previous frames based on movement of the image capture device and/or finger of the user; and display, on a display of the communication device, augmented reality images comprising the subsequent frames of the image data overlaid with a virtual nail treatment occupying at least a portion of the one or more fingernail regions, wherein the augmented reality images depict movement of the finger and fingernail while maintaining the virtual nail treatment on the fingernail region.

9. The system of claim 8, wherein the one or more processors are further configured with processor-executable instructions included in the client application to display, on the display of the communication device, an identifier of the virtual nail treatment.

10. The system of claim 9, wherein the identifier is selectable to initiate communication with at least one of a networked resource at which one or more products corresponding to the virtual nail treatment and a schedule application configured to schedule an appointment with a service provider of the virtual nail treatment.

11. The system of claim 9, wherein the one or more processors are further configured with processor-executable instructions to perform operations comprising storing, in a data store associated with the communication device, user profile data, the user profile data corresponding to the identifier of the virtual nail treatment.

* * * * *